(12) United States Patent
Stein et al.

(10) Patent No.: US 8,342,725 B2
(45) Date of Patent: Jan. 1, 2013

(54) LIGHT BAR

(75) Inventors: Paul L. Stein, O'Fallon, MO (US); Timothy B. Murray, Kirkwood, MO (US); Roger L. Miller, Crestwood, KY (US)

(73) Assignee: Code 3, Inc., St. Louis, MO (US)

( * ) Notice: Subject to any disclaimer, the term of this patent is extended or adjusted under 35 U.S.C. 154(b) by 355 days.

(21) Appl. No.: 12/566,017

(22) Filed: Sep. 24, 2009

(65) Prior Publication Data

US 2010/0073948 A1    Mar. 25, 2010

Related U.S. Application Data

(60) Provisional application No. 61/099,833, filed on Sep. 24, 2008, provisional application No. 61/162,452, filed on Mar. 23, 2009.

(51) Int. Cl.
   *B60Q 1/52*    (2006.01)
   *F21V 5/00*    (2006.01)

(52) U.S. Cl. ... 362/493; 362/542; 362/545; 362/311.02; 362/509

(58) Field of Classification Search ............... 362/493, 362/540, 545, 311.02, 249.02, 249.12, 362, 362/542, 509, 217.1; 340/815.45; 257/98
See application file for complete search history.

(56) References Cited

U.S. PATENT DOCUMENTS

| | | | |
|---|---|---|---|
| 4,160,286 A * | 7/1979 | Merritt | 362/311.04 |
| 4,744,012 A * | 5/1988 | Bergkvist | 362/84 |
| 4,915,479 A | 4/1990 | Clarke | |
| 5,255,171 A | 10/1993 | Clark | |
| D345,315 S | 3/1994 | Green et al. | |
| D355,142 S | 2/1995 | Wagner | |
| D363,675 S | 10/1995 | Sasaki et al. | |
| 5,823,965 A * | 10/1998 | Rasmussen | 600/462 |
| 5,826,965 A | 10/1998 | Lyons | |
| 5,884,997 A | 3/1999 | Stanuch et al. | |
| D410,402 S | 6/1999 | Stein et al. | |
| D432,038 S * | 10/2000 | Sasaki et al. | D10/114 |
| 6,205,998 B1 | 3/2001 | Winston | |

(Continued)

FOREIGN PATENT DOCUMENTS

DE    19916238 A1    10/2000

(Continued)

OTHER PUBLICATIONS

Invitation to Pay Additional Fees regarding International Application No. PCT/US2009/058142 dated Dec. 4, 2009, 7 pages.

(Continued)

*Primary Examiner* — Peggy A. Neils
(74) *Attorney, Agent, or Firm* — Senniger Powers LLP

(57) ABSTRACT

A light bar may include a light head with chip-on-board (COB) light emitting diode (LED) and an optic component mounted adjacent to the COB LED. The light bar may comprise short and long center modules. The light bar may include a plurality of housing modules where each housing module includes a light head and a lens cover having a top portion that is substantially impervious to ultraviolet radiation, and a lens portion extending downward from the top portion in generally opposing relationship with the light head. The light bar may include a circuit board including a wire-to-board connector, and a light head including a wire-to-board connector mated with the wire-to-board connector on the circuit board to electrically connect the light head to the circuit board. The light head may include a holographic diffuser.

24 Claims, 16 Drawing Sheets

U.S. PATENT DOCUMENTS

| | | |
|---|---|---|
| 6,272,269 B1 | 8/2001 | Naum |
| 6,318,863 B1 | 11/2001 | Tiao et al. |
| 6,406,169 B1 * | 6/2002 | Munsey ................. 362/485 |
| 6,441,750 B1 * | 8/2002 | Hutchison ............. 340/907 |
| 6,637,924 B2 | 10/2003 | Pelka et al. |
| 6,814,459 B2 | 11/2004 | Pederson |
| 6,856,436 B2 | 2/2005 | Brukilacchio et al. |
| 6,857,772 B2 | 2/2005 | Brukilacchio |
| 6,871,982 B2 | 3/2005 | Holman et al. |
| 6,967,986 B2 | 11/2005 | Kowarz et al. |
| 6,968,103 B1 | 11/2005 | Schroll et al. |
| 7,001,084 B2 | 2/2006 | Carpenter et al. |
| 7,008,079 B2 | 3/2006 | Smith |
| 7,009,789 B1 | 3/2006 | Brown |
| 7,121,691 B2 | 10/2006 | Coushaine et al. |
| 7,148,957 B2 | 12/2006 | Tolbert et al. |
| 7,153,015 B2 | 12/2006 | Brukilacchio |
| 7,189,983 B2 | 3/2007 | Aguirre et al. |
| D545,230 S | 6/2007 | Jalala |
| 7,234,820 B2 | 6/2007 | Harbers et al. |
| 7,246,917 B2 | 7/2007 | Rhoads et al. |
| 7,253,448 B2 * | 8/2007 | Roberts et al. ............ 257/99 |
| 7,280,722 B2 | 10/2007 | Temkin et al. |
| 7,300,175 B2 | 11/2007 | Brukilacchio |
| 7,357,530 B2 * | 4/2008 | Wang et al. ......... 362/249.01 |
| 7,372,642 B2 | 5/2008 | Rohaly et al. |
| D578,425 S | 10/2008 | Shin |
| 7,455,410 B2 | 11/2008 | Furusawa et al. |
| D585,318 S | 1/2009 | Jalala |
| 7,476,013 B2 * | 1/2009 | Gergets et al. ............ 362/493 |
| 7,481,538 B2 | 1/2009 | Furusawa et al. |
| 7,488,088 B2 | 2/2009 | Brukilacchio |
| 7,488,101 B2 | 2/2009 | Brukilacchio |
| 7,488,102 B2 | 2/2009 | Brukilacchio |
| 7,513,659 B2 * | 4/2009 | Vukosic et al. ............ 362/373 |
| D602,391 S | 10/2009 | Stein |
| 7,621,658 B2 * | 11/2009 | Grotsch et al. ............ 362/336 |
| 7,646,550 B2 | 1/2010 | Rohaly et al. |
| 7,819,591 B2 | 10/2010 | Rohaly et al. |
| 7,832,878 B2 * | 11/2010 | Brukilacchio et al. ......... 353/99 |
| 7,854,531 B1 * | 12/2010 | Lyons ................. 362/217.1 |
| 7,898,665 B2 | 3/2011 | Brukilacchio et al. |
| 7,963,666 B2 | 6/2011 | Leung et al. |
| 8,035,121 B2 * | 10/2011 | Park ................. 257/98 |
| 2003/0031028 A1 * | 2/2003 | Murray et al. ............ 362/545 |
| 2005/0224846 A1 | 10/2005 | Imato et al. |
| 2006/0043400 A1 | 3/2006 | Erchak et al. |
| 2006/0250269 A1 | 11/2006 | Wang et al. |
| 2007/0024461 A1 | 2/2007 | Pederson et al. |
| 2007/0128745 A1 | 6/2007 | Brukilacchio et al. |
| 2007/0258239 A1 | 11/2007 | Stein et al. |
| 2008/0030974 A1 * | 2/2008 | Abu-Ageel ............ 362/19 |
| 2009/0122533 A1 | 5/2009 | Brukilacchio |
| 2009/0207612 A1 * | 8/2009 | Datz et al. ............ 362/249.14 |
| 2010/0110660 A1 * | 5/2010 | Brukilacchio ............ 362/84 |

FOREIGN PATENT DOCUMENTS

JP      409069303 A   *   3/1997

OTHER PUBLICATIONS

Superior Chip-on-Board Technology for the most demanding LED applications, LED Solutions, PerkinElmer, 8 pages.

Computer Desktop Encyclopedia 2000, Definition of "Tape Automated Bonding", 1 page.

* cited by examiner

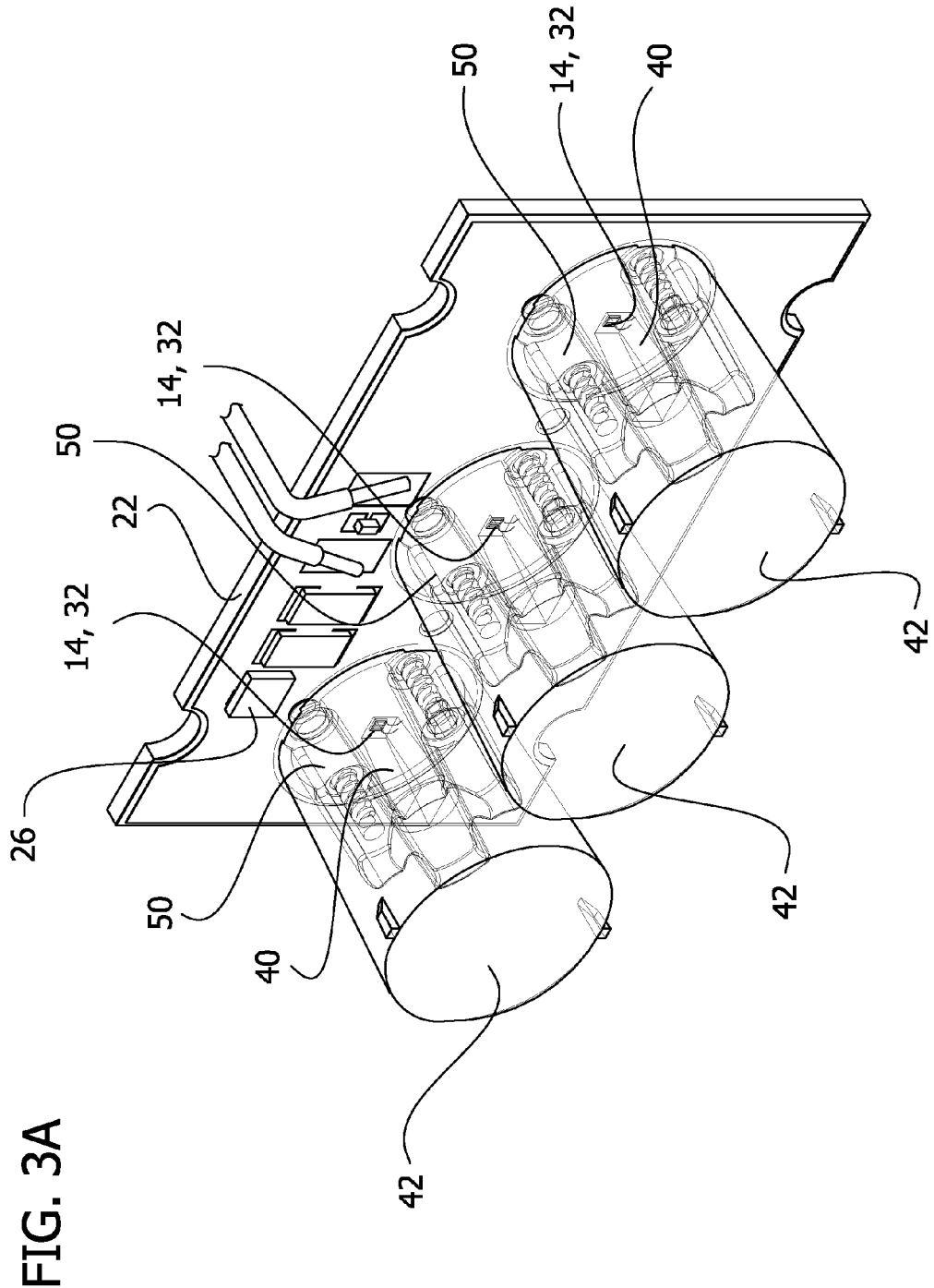

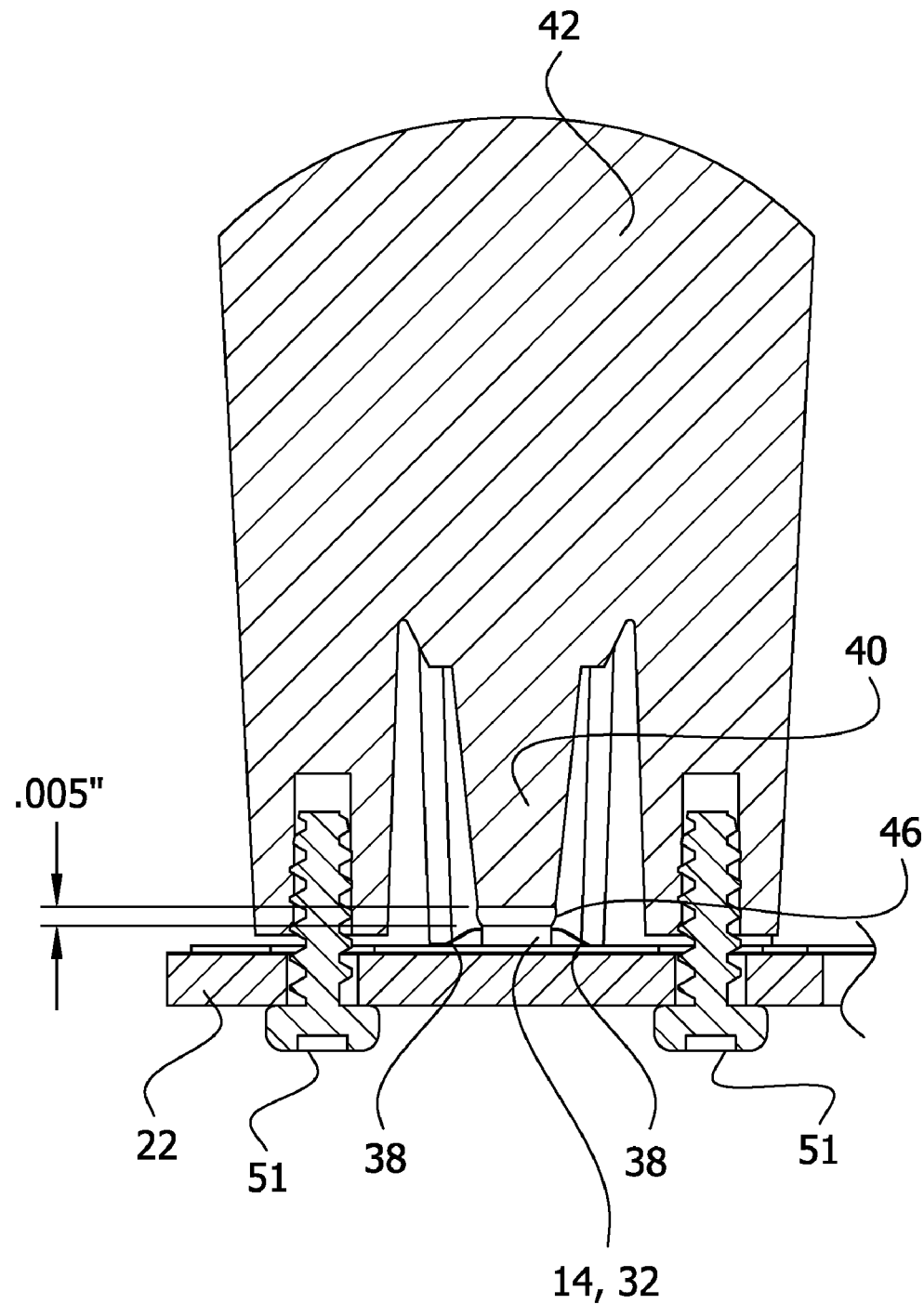

LIGHT BAR

FIELD OF THE INVENTION

The present invention generally relates to a light bar.

BACKGROUND

Warning light signals are generally used to clear the right of way or to warn oncoming motorists of potential moving or stationary hazards, such as a vehicle that is stopped or a vehicle moving slower or faster than the rate of traffic. Warning light signals may also be used to provide specific directions to motorists, such as merge right or merge left or pull over. Some vehicles incorporate an arrow board or even a text matrix display to generate warning light signals to direct traffic.

The use of emergency beacons is restricted by law in many jurisdictions only for responding to an emergency, initiating a traffic stop, bona fide training exercises, or when a specific hazard exists in the road.

SUMMARY

In one aspect, a light bar generally comprises a light head. The light head generally comprises a heat sink, and a circuit board in heat transfer communication with the heat sink. The circuit board has an electrically conductive pathway. A chip-on-board (COB) light emitting diode (LED) is mounted directly in contact with the circuit board such that heat generated by the COB LED when energized is transferred to the circuit board. The COB LED has an LED chip electrically connected to the electrically conductive pathway of the circuit board. An optic component is mounted adjacent to the COB LED to capture light emitted by the COB LED when energized and to transmit the captured light. A transparent housing encloses the plurality of light heads. A microcontroller is electrically connected to the COB LED energize the LED chip so that the transmitted light creates warning light signals when viewed by an observer remote from the light bar.

In another aspect, a light bar generally comprises an elongate base having opposite longitudinal ends and a length extending between the longitudinal ends. First and second outboard housing modules are removably secured to the base adjacent to the opposite longitudinal ends of the base. At least one light head is disposed in each of the first and second outboard housing modules. A short center module is removably secured to the base between the first and second outboard housing modules. The short center module has a length extending along the length of the base. At least one light head is disposed in the short center module. A long center module is removably secured to the base between the first and second outboard housing modules. The long center module has a length extending along the length of the base. At least one light head is disposed in the long center module. The length of the long center module is greater than the length of the short center module.

In yet another aspect, a light bar generally comprises an elongate base having a length extending between opposite longitudinal ends, and a plurality of housing modules secured along the length of the base. Each housing module includes at least one light head, a platform on which the at least one light head is mounted, and a lens cover secured to the platform. The lens cover has a top portion that is substantially impervious to ultraviolet radiation, and a lens portion extending downward from the top portion in generally opposing relationship with the at least one light head.

In another aspect, a light bar generally comprises a circuit board including a wire-to-board connector, and a light head including a wire-to-board connector mated with the wire-to-board connector on the circuit board to electrically connect the light head to the circuit board.

In yet another aspect, a light bar generally comprises a light head including a light source for selectively emitting light when energized, a collector adjacent to the light source to capture light emitted by the light source when energized, a collimator adjacent to the collector adapted to receive the captured light from the collector and transmit the captured light as a substantially spatially uniform beam, and a holographic diffuser adjacent to the collimator for receiving the substantially spatially uniform beam from the collimator and for transmitting the light in an output pattern which is horizontally diverging at a horizontal angle which is greater than a horizontal divergence angle of the substantially spatially uniform beam. A transparent housing encloses the plurality of light heads. A microcontroller electrically connected to the light source energizes the light source so that the transmitted light creates warning light signals when viewed by an observer remote from the light bar.

BRIEF DESCRIPTION OF THE DRAWINGS

FIG. 3A is an enlarged perspective of an optic components and COB LEDs mounted on a circuit board of the light head in FIG. 2, each optic component being associated with one COB LED;

FIG. 5 is an enlarged, fragmentary cross-section of one of the optic components, COB LED, and the circuit board in FIG. 3A, including protective material covering the COB LED;

Corresponding reference characters indicate corresponding parts throughout the drawings.

DETAILED DESCRIPTION OF THE DRAWINGS

Figure 1:
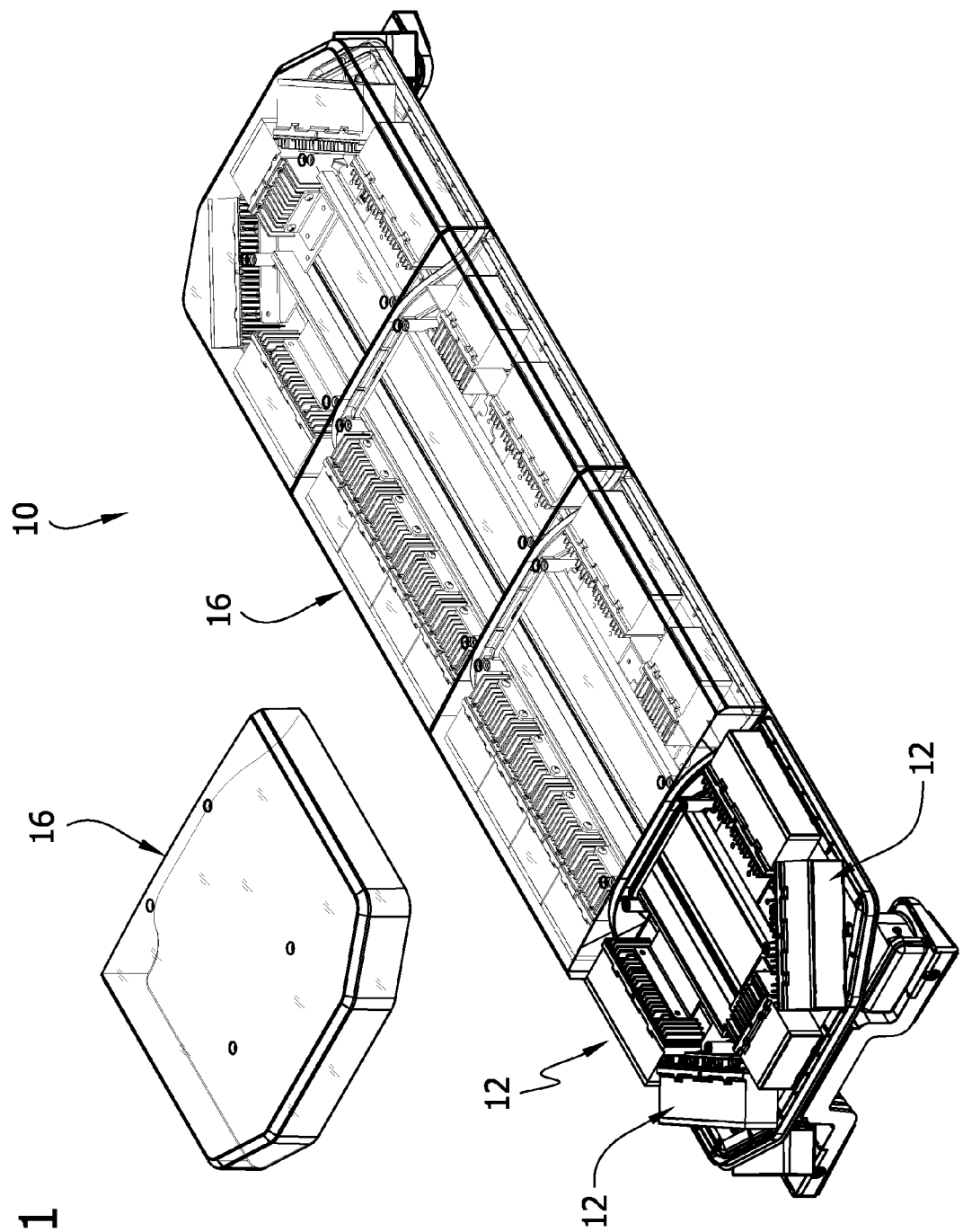
FIG. 1 is a perspective of one embodiment of a light bar including a plurality of light heads including chip-on-board light emitting diodes (COB LED)

Referring to FIG. 1, one embodiment of a light bar 10 generally comprises at least one light head 12 including at least one chip-on-board light emitting diode (COB LED 14), a housing, generally indicated at 16, enclosing the light head 12, and a microcontroller 18 (FIG. 13) in the housing to energize the COB LED 14 to create warning light signals when viewed by an observer remote from the light bar 10. In the illustrated embodiment, the light bar 10 comprises a plurality of such COB LED 14 light heads 12, although it is understood that the light bar 10 may comprise a single COB LED 14 light head 12 without departing from the scope of the present invention. As will be explained in more detail below, in one embodiment the microcontroller 18 is electrically connected to each of the light heads 12 so that the microcontroller controls each of the COB LEDs 14 in each of the light heads.

Figure 2:
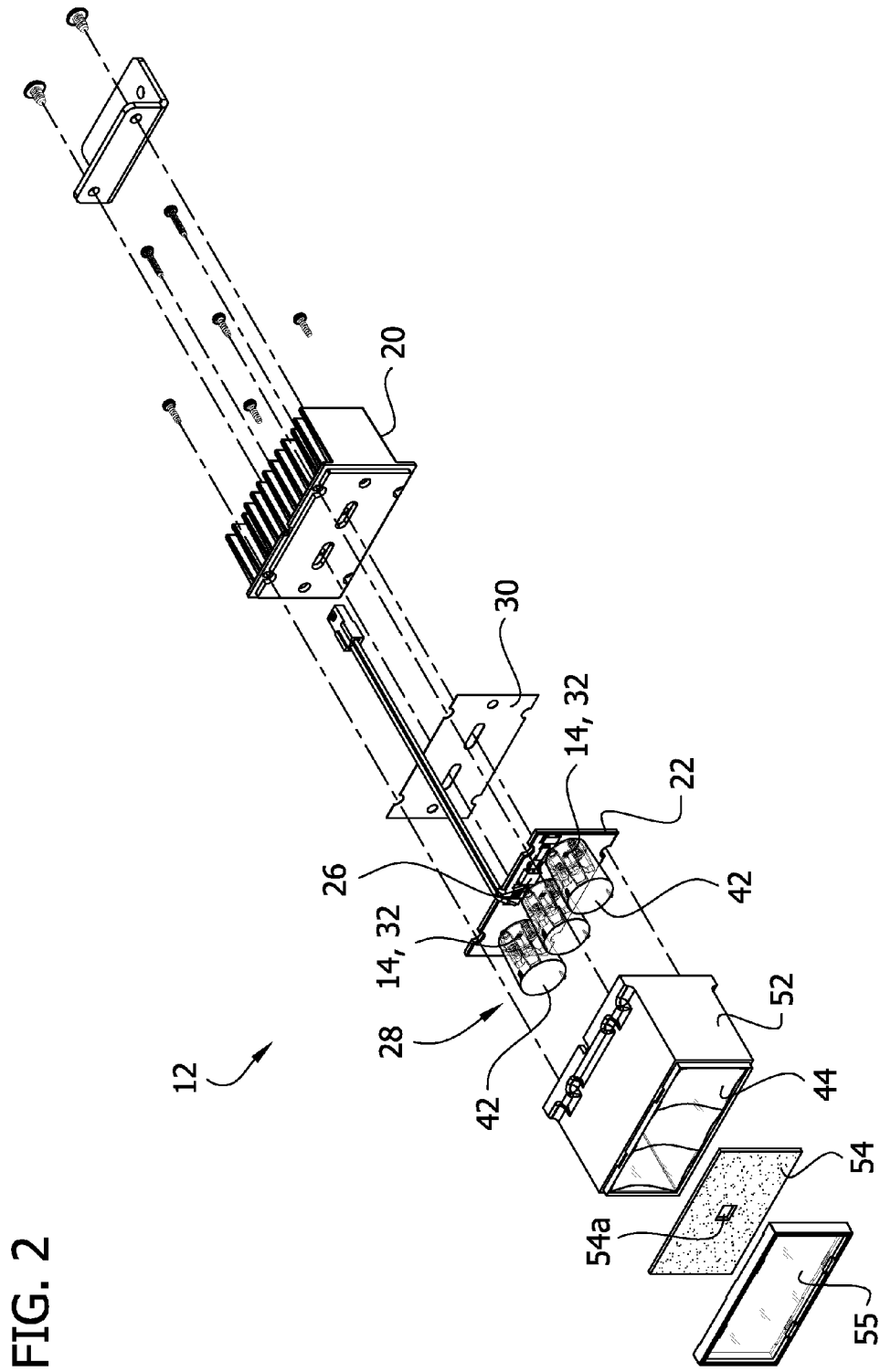
FIG. 2 is an exploded view of one of the light heads in FIG. 1.
Figure 4A:
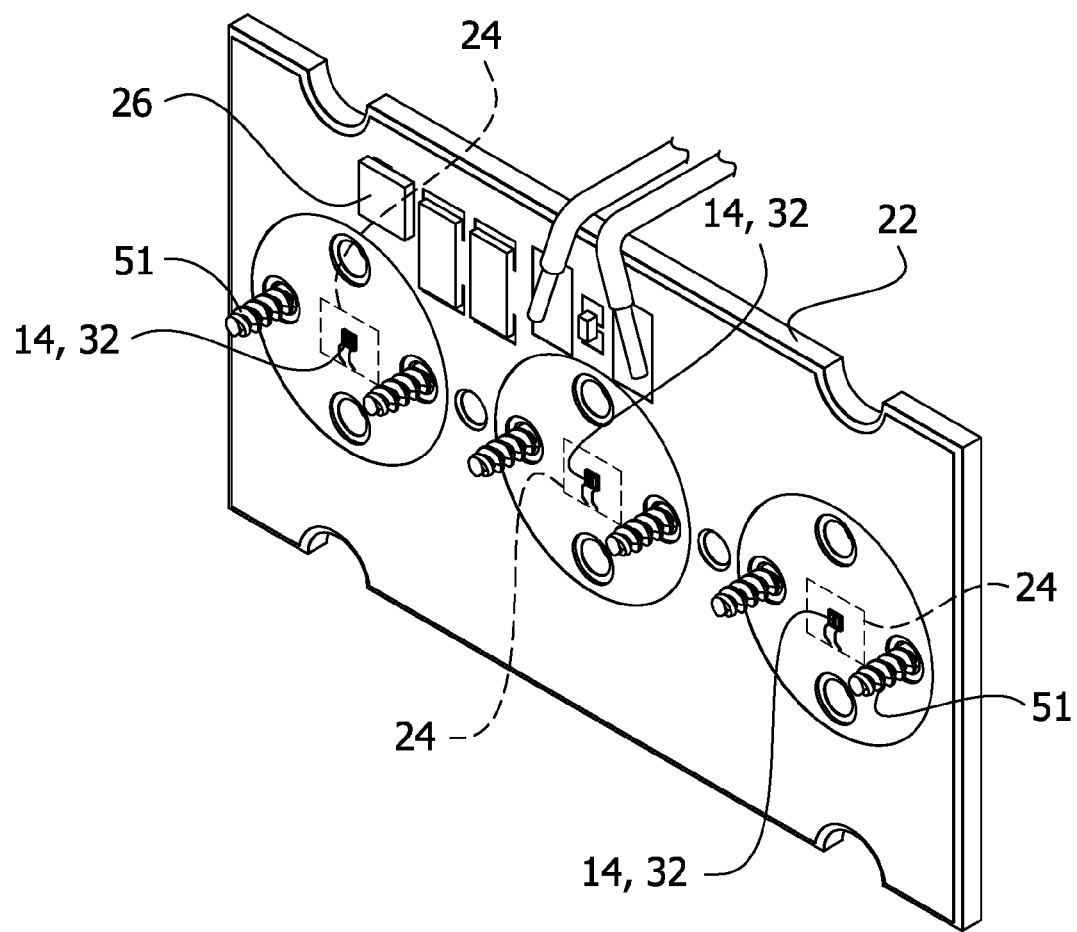
FIG. 4A is an enlarged perspective of the circuit board in FIG. 3A with the optic components removed.
Figure 4B:
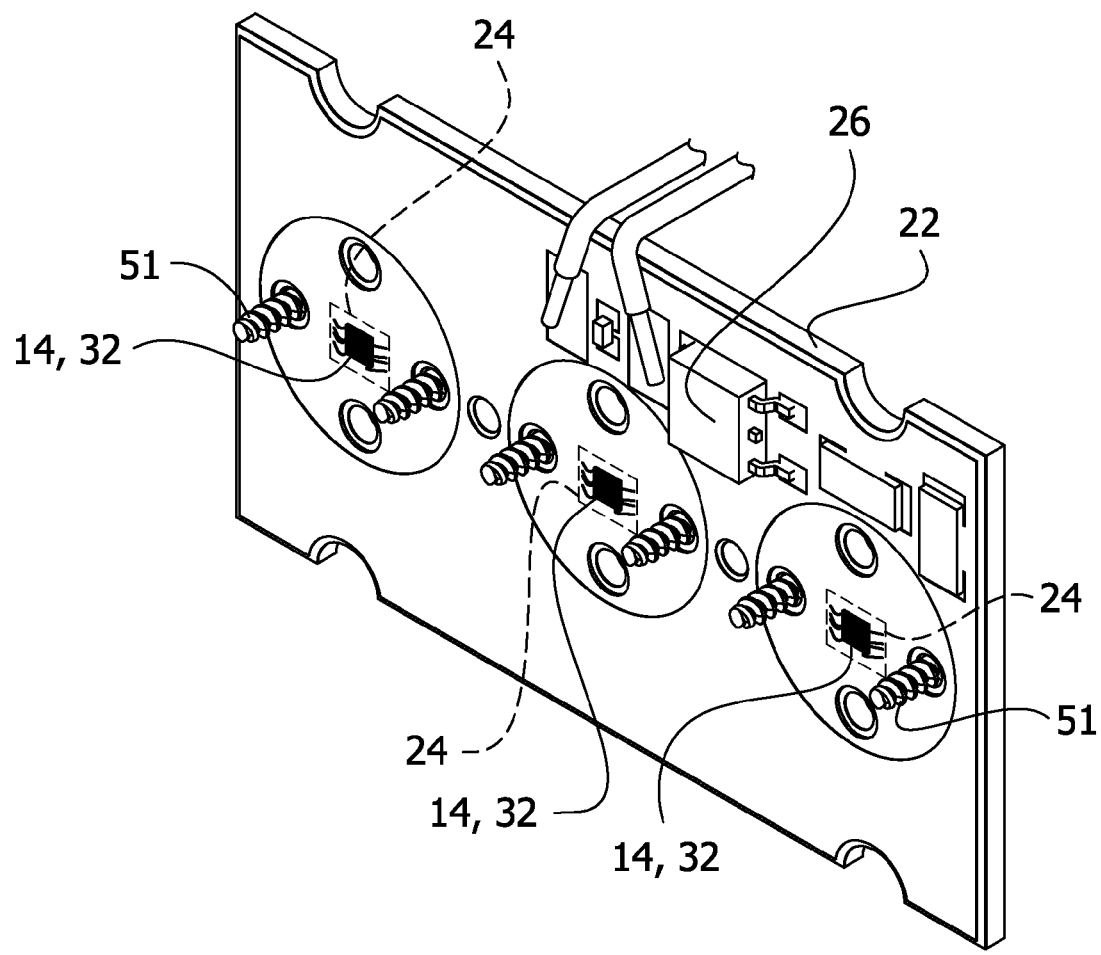
FIG. 4B is an enlarged perspective of the circuit board in FIG. 4A with the optic components removed.

Referring to FIG. 2, each of the illustrated COB LED 14 light heads 12 generally includes a heat sink 20, a circuit board 22 mounted on the heat sink 20 in thermal contact therewith, at least one defined light emitting area 24 (FIG. 4) on the circuit board, including at least one COB LED 14, a driver 26 on the board in electrical communication with the microcontroller 18 and the COB LED 14, and at least one optic component 28 for capturing and transmitting light emitted from the light emitting area(s). It is understood that in an alternate embodiment an independent microcontroller may be mounted on each board 22 to control the COB LED(s) 14 in the corresponding light head 12. The microcontroller 18 is in communication with an input device, such as a keypad (not shown) controlled by an operator.

Each light head 12 may include any number of defined light emitting areas 24 on the circuit board 22. For example, in the illustrated embodiment the circuit board 22 is mounted in a vertical plane in the light bar 10, and the board 22 includes three light emitting areas 24 arranged as a horizontal linear array comprising a horizontal row of the COB LEDs 14. In another embodiment, the circuit board 22 may be mounted in a vertical plane in the light bar 10, and a plurality of light emitting areas 24 may be arranged in vertical linear array. In yet another embodiment, the circuit board 22 may be mounted in a vertical plane in the light bar 10, and a plurality of light emitting areas 24 may be arranged in a 2D array having at least two columns and two rows.

Figure 3B:
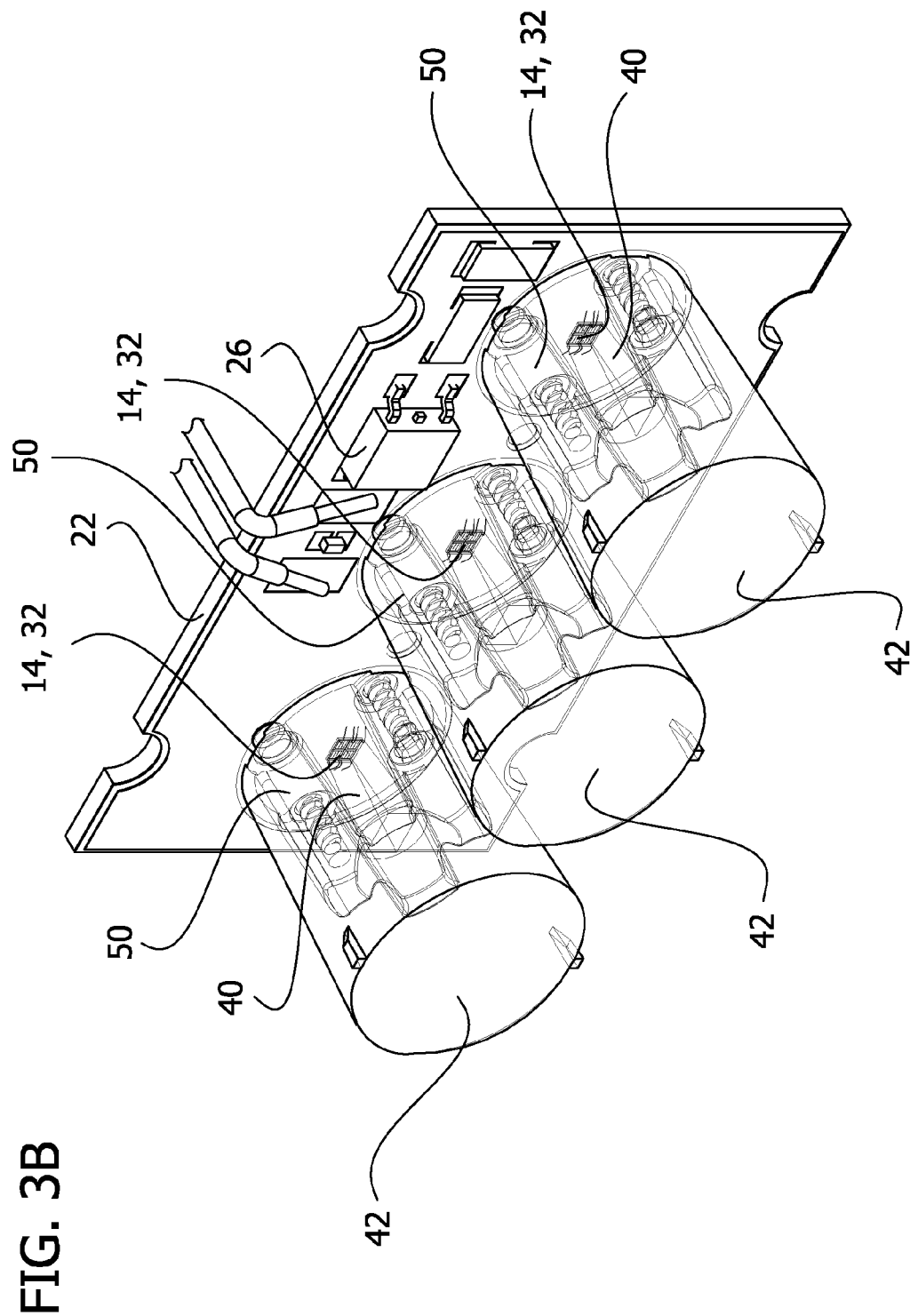
FIG. 3B is an enlarged perspective of other embodiments of optic components and COB LEDs mounted on a circuit board of a light head, each optic component being associated with four COB LED.
Figure 7:
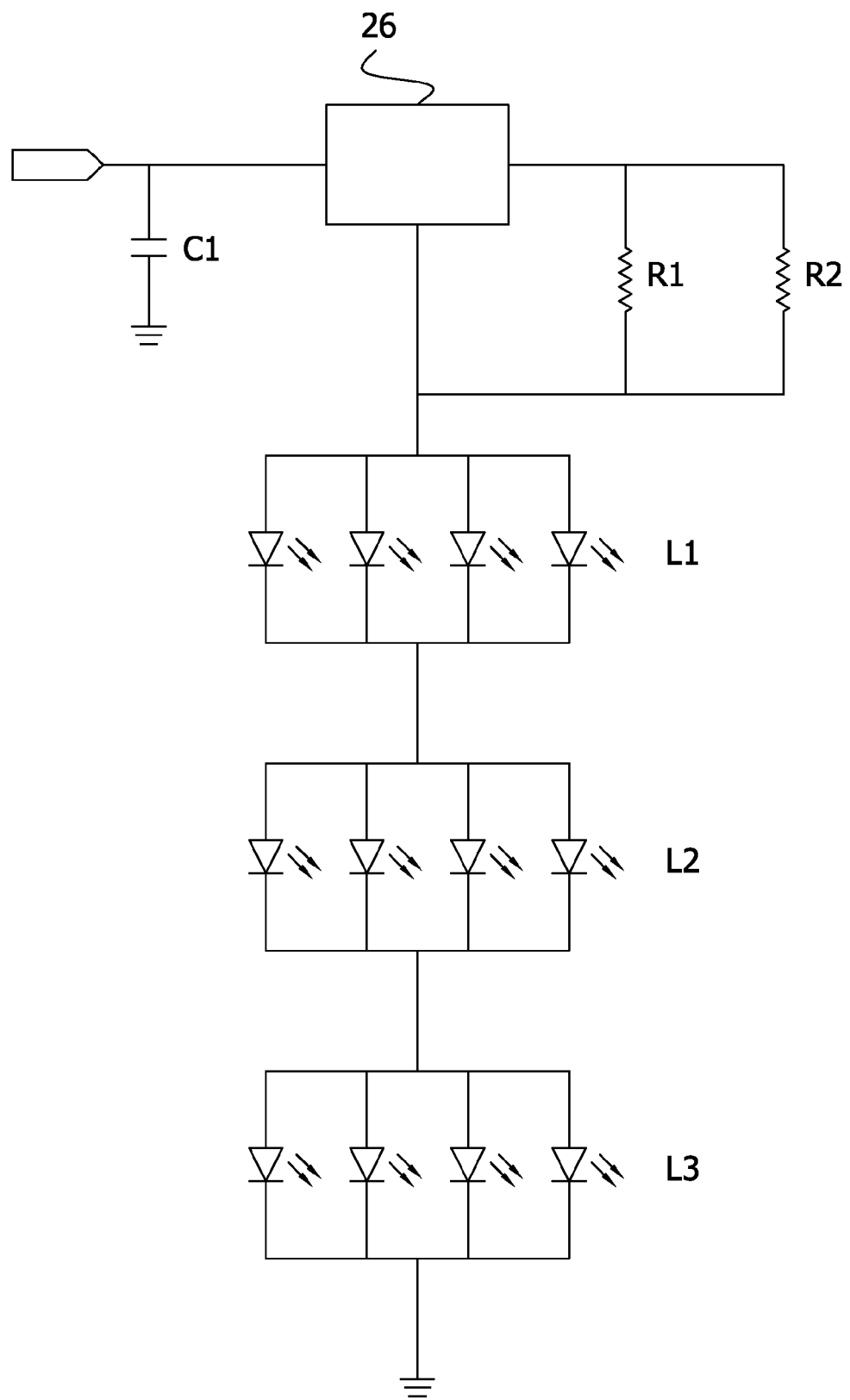
FIG. 7 is a schematic diagram of one embodiment of a parallel-series connection of four COB LEDs in each of three light defining areas.

As stated above, each defined light emitting area 24 on the circuit board 22 includes at least one COB LED 14. In the light head embodiment illustrated in FIGS. 3 and 4, each defined light emitting area 24 includes one COB LED 14. In the illustrated embodiment in FIGS. 3A and 4A, each defined light emitting area 24 includes a plurality (e.g., 4) COB LEDs 14. The type of light head 12 illustrated in FIGS. 3B and 4B may be used as a takedown light head. As an example and referring to FIG. 7, each COB LED 14 within the same light emitting area 24 may be electrically connected to each other in parallel. Moreover, each light emitting area 24 may be electrically connected to other light emitting areas in series. In the schematic illustrated in FIG. 7, the C1 may have a capacitance of about 0.001 μF, R1 may have a resistance of about 2.4 Ohms, and R2 may have a resistance of about 2.4 Ohms. Other ways of electrically connecting the COB LEDs are possible without departing from the scope of the present invention. It is understood that each defined light emitting area 24 may include any number of COB LEDs 14 without departing from the scope of the present invention.

Figure 6:
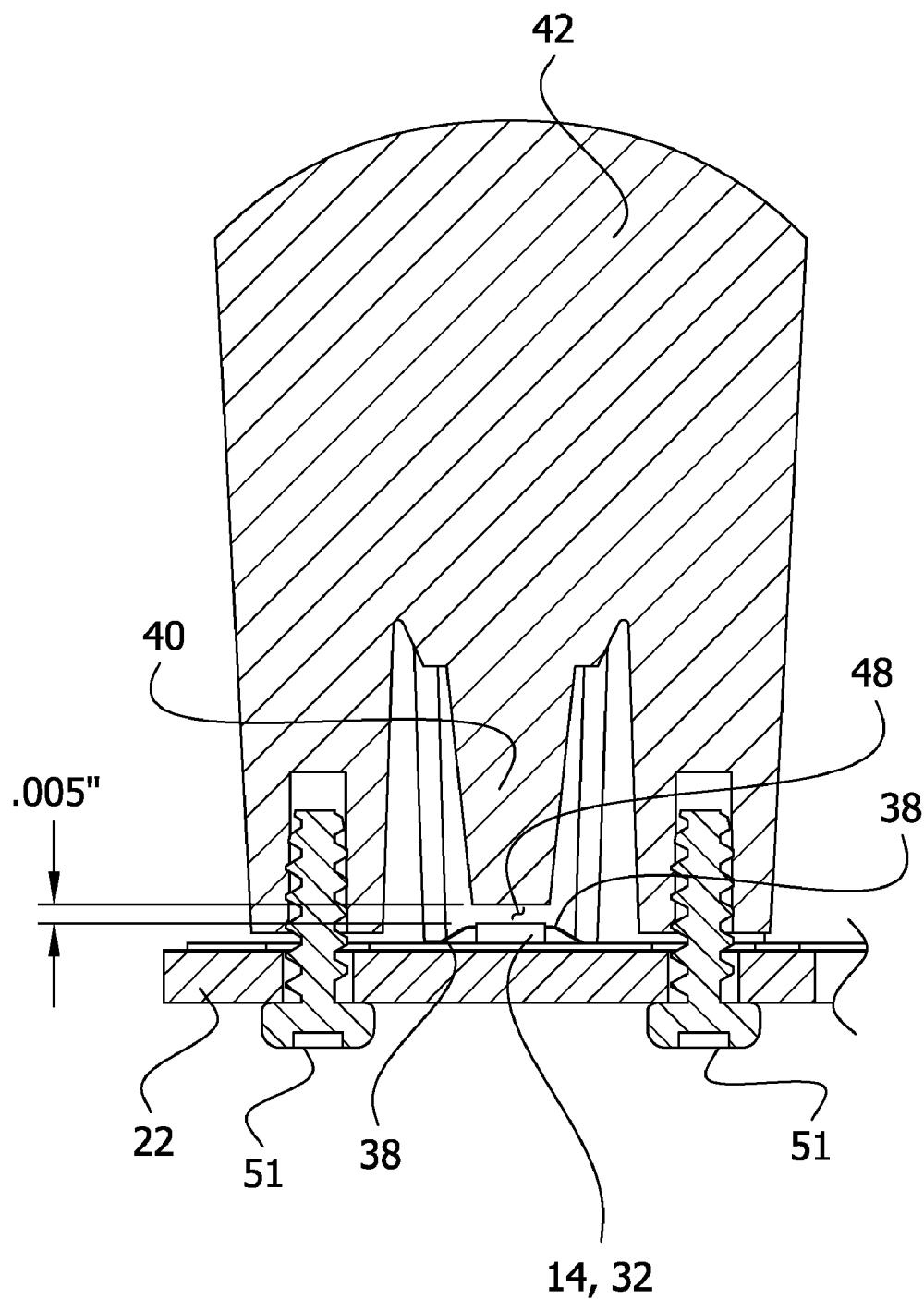
FIG. 6 is similar to FIG. 5 except that the protective material covering the COB LED is removed.

Each COB LED 14 is mounted directly in contact with the circuit board 22 such that heat generated by the COB LED 14 when energized is transferred to the circuit board 22. This heat is then transferred to the heat sink 20. The light head(s) 12 may include thermal transfer layer 30 (FIG. 2), such as a thermal conducting plastic, for facilitating heat transfer between the circuit board 22 and the heat sink 20. Each COB LED 14 includes an LED chip or die 32 electrically connected to an electrically conductive pathway (not shown) on the circuit board 22. The driver 26 on the board 22 is electrically connected to each of LED chip 32 via the conductive pathway of the circuit board 22 for energizing the LED chips 32. Referring to FIGS. 5 and 6, in the illustrated embodiment, each LED chip 32 is electrically connected to the circuit board 22 by a bond wire 38, although other ways of electrically connecting the LED chip 32 to the circuit board 22 is within the scope of the invention. In one example, each bond wire 38 is bonded to the LED chip 32 by a wedge bond. The wedge-bonded bond wire 38 has a lower profile (i.e., the wire extends outward from the LED chip 32 at a smaller angle) than if the bond wire 38 was ball-bonded to the LED chip 32. This lower profile allows the optic component 28 to be positioned closer to the LED chip 32 (e.g., within 0.005 inches) than if the bond wire 38 was ball-bonded to the LED chip. The bond wire 38 may also be bonded to the electrically pathway 34 in the circuit board 22 by a wedge bond or another type of bond.

Referring to FIGS. 2-4A and 5-6, the illustrated embodiment includes three optic components 28, and each optic component is associated with one of the light emitting areas 24. Each optic component 28 in the illustrated embodiment generally includes an optical concentrator 40 (e.g., a compound parabolic concentrator 40 (CPC), a flat plate collector (FPC), a V-trough concentrator, a parabolic trough concentrator (PTC), a Fresnel lens concentrator, a conical concentrator, a paraboloidal concentrator, a compound elliptical concentrator (EPC), a hyperpolodial concentrator (trumpet concentrator), a spherical concentrator, or a pyramidical concentrator), an optical collector 42 (e.g., a parabolic collector 42) and an optical collimator 44. The optical concentrator 40 has an input surface adjacent to the corresponding LED chip(s) 32. In one embodiment (FIG. 5), the input surface of the concentrator 40 is in physical contact with and/or received in a transparent protective material 46 covering the LED chip(s). The protective material 46 may include a transparent gel or transparent epoxy material (e.g., LS-3354 silicon gel by NuSil of Carpinteria, Calif.). In one example, for each LED chip the protective material 46 has an index of refraction substantially matching the index of refraction of the concentrator 40. In this example, the transparent protective material 46 is applied to the bottom surface of the concentrator 40 and the top surface of the COB LED 14. The transparent material 46 preferably does not extend along the sides of the COB LED 14 to the circuit board so that the material reflects most if not all of the light emitted from the COB LED into the concentrator 40 and does not scatter a significant amount of light radially outward. In another embodiment (FIG. 6), the concentrator 40 is not in contact with or received in the protective material 46. Instead, an air space 48 is between the input surface of the concentrator 40 and the LED chip(s), which may be a LED chip that emits white light. It is understood that the optic components 28 may be of other configurations and include other elements. For example, the optic component 28 may not include an optical concentrator 40 without departing from the scope of the invention.

In one example, each optic component 28 is formed as a separate unit, and the optical concentrator 40 and the optical collector 42 of each optic component 28 are formed as a single, one-piece construction, where the inlet of the collector 42 is at the outlet of the concentrator 40. Each optic component 28 includes stands or legs 50 secured to the circuit board 22 (such as by fasteners or screws 51) to mount the optic unit to the board 22 so that each optic component is associated with one light emitting area 24. The concentrator 40 and the collector 42 may be formed from a homogenous material that is resistant to optical degradation due to UV radiation and heat cycling, such as acrylic or polycarbonate (e.g., Makrolon® LED-2245 or LED-2045 polycarbonate resin, each by Bayer MaterialScience AG of Pittsburgh, Pa.; Zeonex Cyclo Olefin Polymer by Zeon Chemicals L.P. of Louisville, Ky.) or other material. Although acrylics and polycarbonates may be used to form the concentrator 40, UV radiation from the COB LEDs 14 can cause clouding or reduced transparency over time in certain acrylics and polycarbonates, degrading the optical properties of the concentrator 40 such that the warning signals become less apparent to an observer remote from the light bar. In addition, the ON-OFF cycling of the COB LEDs 14 to create warning signals subjects the concentrator 40 to intermittent heat output by the COB LEDs 14. This results in repeated heating and cooling of the concentrator which causes repeated thermal expansion and contraction of the concentrator. Such heat cycling can cause stress fractures over time in certain acyrlics and polycarbonates, further degrading the optical properties of the concentrator such that the warning signals become less apparent to an observer remote from the light bar. It has been found that polycarbonate resins, such as LED-2245 or LED-2045 noted above, maintain their optical properties and are resistant to such optical degradation, thereby permitting such resins to be used in light bars to repeatedly generate acceptable warning signals that continue over time to be apparent to an observer remote from the light bar. The concentrator 40 and the collector 42 may be formed as an integral construction or as separate components by compression molding, injection molding, or other molding techniques. The concentrator 40 and the collector 42 may be molded within a tolerance of 0.0005 inches whereby shrinkage of the concentrator 40 and the collector 42 after molding is minimized so that the optical properties of the concentrator 40 and the collector 42 when molded is substantially the same as the optical properties of the concentrator 40 and the collector 42 after the molding. Other ways of making the optic component, including the concentrator 40 and the collector 42, are within the scope of the invention. For example, one or more optic components (e.g., three optic components) may be formed together as a single, one-piece unit. It is understood that the optical concentrator 40 and optical collector 42 may be formed in other ways and from other material without departing from the scope of the present invention.

Referring to FIG. 2, the optical collimator 44 is secured at an open end of a casing 52 that is secured to the heat sink 20 and encloses the optic component 28 (e.g., the concentrator 40 and the collector 42) and the circuit board 22. The collimator 44 is configured to make the light from the collector 42 more aligned in a specific direction. The collimator 44 is spaced apart from the output surface of the collector 42. A cross-sectional area of the output surface of the collector 42 is less than a cross-sectional area of an input surface of the collimator 44. In one example, the cross-sectional area of the output surface of the collector 42 is less than the cross-sectional area of the input surface of the collimator 44. The collimator 44 may be formed from the same material as the concentrator 40 and the collector 42. The collimator 44 may be formed from a homogenous material that is resistant to UV radiation, such as acrylic or polycarbonate or other material (e.g., Makrolon® LED-2245 or LED-2045 polycarbonate resin, each by Bayer MaterialScience AG of Pittsburgh, Pa.; Zeonex Cyclo Olefin Polymer by Zeon Chemicals L.P. of Louisville, Ky.). The collimator 44 may be formed by compression molding, injection molding or through other molding techniques. For example, the collimator 44 may be molded within a tolerance of 0.0005 inches whereby shrinkage of the collimator 44 after molding is minimized so that the optical properties of the collimator 44 when molded is substantially the same as the optical properties of the collimator 44 after the molding Light transmitted out of the collimator 44 comprises a spatially uniform beam. In the illustrated embodiment, an optical diffuser 54 is provided between the collimator 44 and an end cap 55 of the light head 12 to receive the light from the collimator and redistribute the light into a desired output pattern. The diffuser 54 may be a holographic diffuser, such as a holographic elliptical diffuser, formed of a polycarbonate material. In the illustrated embodiment, the diffuser 54 is formed as a separate component and secured to the light head 12 by sandwiching it between the collimator 44 and the end gap 55. In another embodiment, the holographic elliptical diffuser 54 (e.g., textured polycarbonate material) can be molded onto the interior surface of a light head cap 55. Other ways of forming the optical diffuser, such as a holographic elliptical diffuser, and securing the diffuser to the light head is within the scope of the present invention.

In one example, the diffuser 54 (e.g., a holographic diffuser such as a holographic elliptical diffuser) is configured to produce an output pattern that is horizontally diverging at a horizontal angle which is greater than a horizontal divergence angle of the spatially uniform beam. The diffuser 54 may also be configured to produce an output pattern that is vertically diverging at a vertical angle which is greater than a vertical divergence angle of the spatially uniform beam. In another example, the diffuser 54 is configured to produce an output pattern that partially redistributes or transmits the transmitted light so that some of the transmitted light is redistributed or transmitted by the diffuser 54 and some of the transmitted light is not redistributed or transmitted by the diffuser 54. In yet another example, the diffuser 54 has an opening 54a positioned over the collimator 44 so that some of the transmitted light is redistributed or transmitted by the diffuser 54 and some of the transmitted light is not redistributed or transmitted by the diffuser 54 and passes through the opening. In another example, the diffuser 54 is configured to produce an output pattern that comprises a substantially rectangular pattern when viewed by an observer remote from the light bar 10. The diffuser54 may be a holographic elliptical diffuser having a diffusing angle greater than 45 degrees, and more preferably, within a range of greater than 45 degrees to about 80 degrees, more preferably within a range of about 55 degrees to about 70 degrees, and still more preferably, about 60 degrees.

In one example (e.g., FIGS. 3 and 4), the COB LED(s) 14 in a first light emitting area 24 of the light head 12 may constitute a first COB LED(s) 14 configured to emit light having a first color in one wavelength range, and the COB LED(s) 14 in a second light emitting area 24 may constitute a second COB LED(s) 14 configured to emit light having a second color different than the first color in a second wavelength range different than the first wavelength range. Moreover, the COB LED(s) 14 in a third light emitting area 24 may constitute a third COB LED(s) configured to emit light having a third color different than the first and second colors in a third wavelength range different than the first and second wavelength ranges. It is understood that there may be any number of different COB LEDs 14 (i.e., two or more) that are configured to emit light having a different color and wavelength range than those of the other COB LEDs within the same light head 12. It is also understood that the COB LEDs in two or more light emitting areas may be configured to emit light having substantially the same color and substantially the same wavelength range.

The microcontroller 18 may be configured to do one or more of the following: selectively energize the first COB LED(s) 14 to create warning light signals including light having the first color; selectively energize second COB LED (s) 14 to create warning light signals including light having the second color; and selectively energize both the first COB LED(s) 14 and the second COB LED(s) 14 simultaneously to create warning light signals including light having the first color and the second color.

The microcontroller 18 may be configured to energize only one of the first COB LED(s) 14 and the second COB LED(s) 14 and to not simultaneously energize both the first COB LED(s) 14 and the second COB LED(s) 14.

The microcontroller 18 may be configured to energize the first COB LED(s) 14 and the second COB LED(s) 14 in a first pattern to provide a traffic directing signal, and to energize the first COB LED(s) 14 and the second COB LED(s) 14 in a second pattern to provide a warning signal.

The microcontroller 18 may be configured to energize the light heads 12 in a first pattern and a different second pattern. During the first pattern, the microcontroller energizes the first COB LEDs 14 of a first selected set of the light heads 12 and the second COB LEDs 14 of the first selected set of light heads 12 are not energized. During the second pattern, the microcontroller energizes the second COB LEDs 14 of a second selected set of the light heads 12 and the first COB LEDs 14 of the second set of light heads 12 are not energized.

The microcontroller may be configured to modulate energization of the first COB LED 14 and the second COB LED 14 to create at least two different warning light signals sequentially presented over a predetermined period of time.

In one example using the above arrangement of the optical concentrator 40, the optical collector 42 and the optical collimator 44, one COB LED 14 on the circuit board 22 can produce an output signal having more lumens after it is transmitted through the optic component 28 than an output signal if the COB LED 14 was replaced with a corresponding pre-packaged LED. For example, a red COB LED can emit more than 50 lumens; a blue COB LED can emit more than 30 lumens; an amber COB LED can emit more than 40 lumens; and a white COB LED can emit more than 100 lumens. It is believed that the greater lumen output using COB LEDs is due to ability to drive the COB LEDs harder than the pre-packaged LEDs without causing early failure because the heat from the COB LEDs can be dissipated more efficiently. Moreover, the use of the optical concentrator 40, the optical collector 42 and the optical collimator 44 increases the overall output of the optical component.

In another example (e.g., FIGS. 3B and 4B), a plurality of N COB LEDs 14 are positioned in a single light emitting area 24 on the circuit board 22 and associated with one of the optic components 28, where N is an integer greater than 1. The optic component 28 comprises a single optical path for combining the light from the N COB LEDs 14 to create a warning light signal. The total transmitted light from the optic component 28 is greater than the total transmitted light if the N COB LEDs 14 were replaced with corresponding pre-packaged LEDs. In this example, the COB LEDs 14 in each light emitting area 24 may be configured to emit light of different colors in different wavelength ranges. For example, a single light emitting area 24 may include one or more first COB LEDs configured to emit light having a first color in one wavelength range, and one or more second COB LEDs 14 configured to emit light having a second color different than the first color in a second wavelength range different than the first wavelength range. Moreover, for example, the same light emitting area 24 may include one or more third COB LEDs configured to emit light having a third color different than the first and second colors in a third wavelength range different than the first and second wavelength ranges. Each of the first, second and third COB LEDs 14 within the same light emitting area 24 may be independently controlled and operated to produce a desired light signal in the same way as described above where each light emitting area has a different COB LED(s) than the other light emitting area(s). It is understood that there may be any number of different COB LEDs 14 (i.e., two or more) that are configured to emit light having a different color and wavelength range than those of the other COB LEDs within the same light emitting area 24. It is also understood that the COB LEDs in one light emitting areas may be configured to emit light having substantially the same color and substantially the same wavelength range.

The microcontroller may be configured to selectively energize the COB LEDs 14 with a pulse width modulated signal having a reduced duty cycle of less than 100%. The reduced duty cycle provides transmitted light of reduced lumens compared to the lumens provided at a 100% duty cycle whereby night blindness is minimized when the COB LED 14 is energized with the reduced duty cycle and the transmitted light at the reduced duty cycle meets or exceeds minimum requirements for a warning light signal.

In one example, one or more of the COB LEDs 14 has one or more of the following: a lumens per amp output greater than the lumens per amp output of a corresponding pre-packaged LED; a lumens output greater than the lumens output of a corresponding pre-packaged LED; a thermal resistance less than the thermal resistance of a corresponding pre-packaged LED; dissipation of heat to the heat sink 20 at a higher rate than the dissipation of heat to a heat sink from a corresponding pre-packaged LED; a maximum driving current greater than a maximum driving current of a corresponding pre-packaged LED; and a heat transfer flux density greater than a heat transfer flux density of a corresponding pre-packaged LED.

In one example, one or more of the COB LEDs 14 has one or more of the following characteristics: more efficient than a corresponding pre-packaged LED in that the COB LED 14 produces more lumens per amp; a greater lumens output than the lumens output of a corresponding pre-packaged LED; a lower thermal resistance than a corresponding pre-packaged LED; a higher heat dissipation rate to the heat sink 20 than a corresponding pre-packaged LED; a greater maximum driving current of than a maximum driving current of a corresponding pre-packaged LED; and a higher heat transfer flux density than a corresponding pre-packaged LED.

Figure 8:
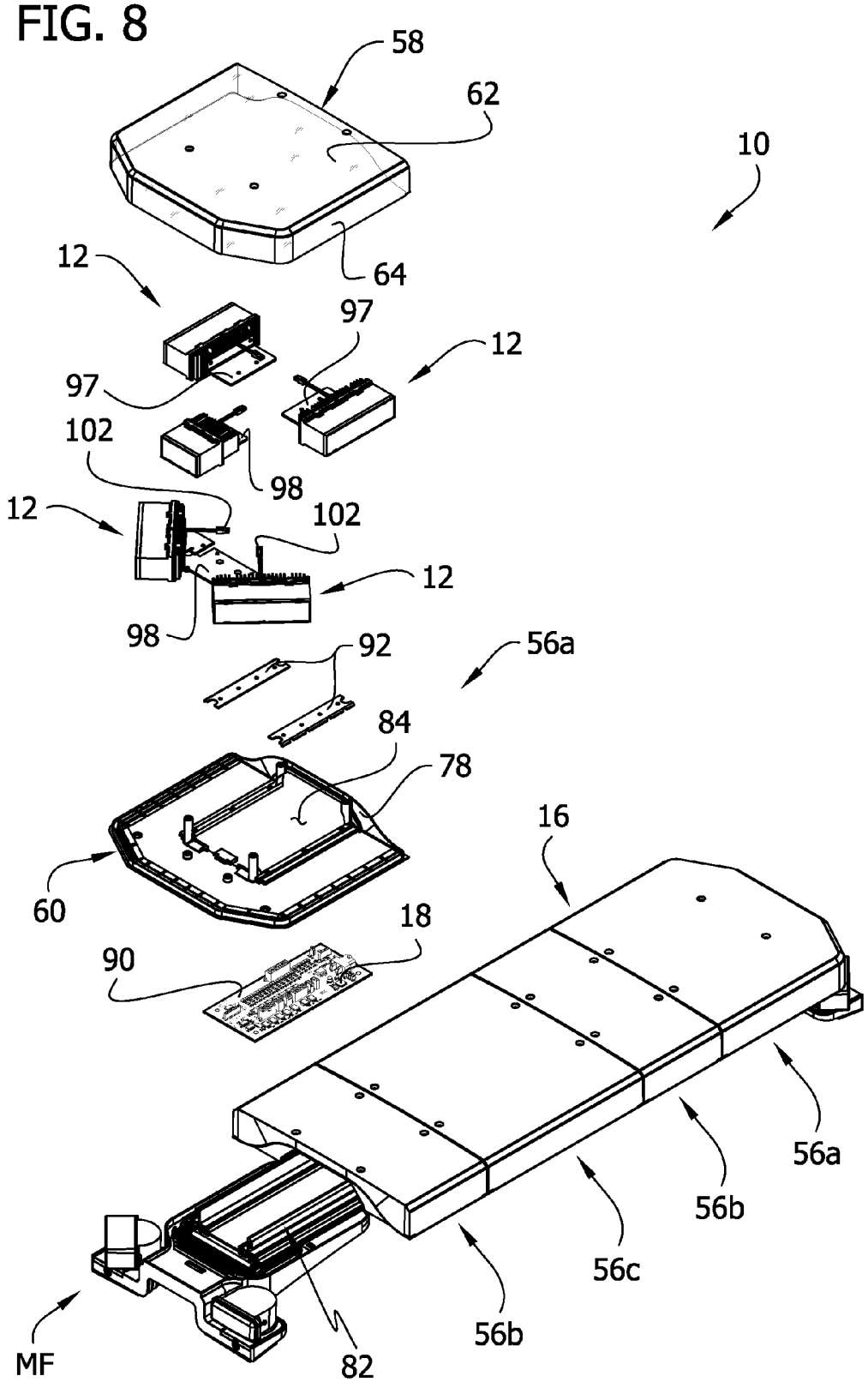
FIG. 8 is a perspective of the light bar with a left outboard housing module exploded.

Referring to FIG. 8, the light bar housing 16 includes a plurality of housing modules mounted on a base, generally indicated at 82. In one embodiment, the housing modules may come in three standard types: an outboard type 56a, a short center type 56b, and a long center type 56c. The short center type 56b is the same configuration as the long center type 56c except that it has a shorter length—respective lengths extending along the length of the light bar 10. In one example, the outboard housing module 56a may have a length of about 12.5 in, the short center housing module 56b may have a length of about 7.0 in, and the long center housing module 56c may have a length of about 11.0 in. The use of two different center housing modules 56b, 56c having different lengths allows for the assembly of light bars having the following exemplary lengths: 23.0 in; 35.0 in; 44.0 in; 47.0 in; 52.0 in; 58.0 in; 70.0 in; 82 in; and 94.0 in. The housing modules 56a, 56b, 56c may have other lengths without departing from the scope of the present invention. The light bar 10 illustrated in FIG. 8 comprises two outboard housing modules 56a, two short center housing modules 56b, and one long center housing module 56c. In this embodiment, light bar 10 may include other types of the light sources besides those having COB LEDs, including but not limited to light sources including pre-packaged LEDs, incandescent lamps, and halogen lamps.

Referring still to FIG. 8, each housing module 56a, 56b, 56c, regardless of its type, comprises a lens cover, generally indicated at 58, secured to a platform, generally indicated at 60. The lens cover 58 has a top portion 62 and a transparent lens portion 64 extending downward from the top portion. The top portion 62 is generally opaque and functions as a solar barrier that blocks UV rays to lessen heat within the module 56a, 56b, 56c and prevent UV degradation of wiring and the light heads 12 in the module. (The top portion 62 is shown as being transparent for illustrative purposes only.) The lens portion 64 is generally transparent and is positioned in generally opposing relationship with the light head 12 when the lens cover 58 is secured to the platform 60. The lens cover 58 may be formed in a two-step molding process, such as by first molding the top portion with a UV impermeable material or composition, and then overmolding the top portion with transparent material or composition to form the lens portion 64.

Figure 9:
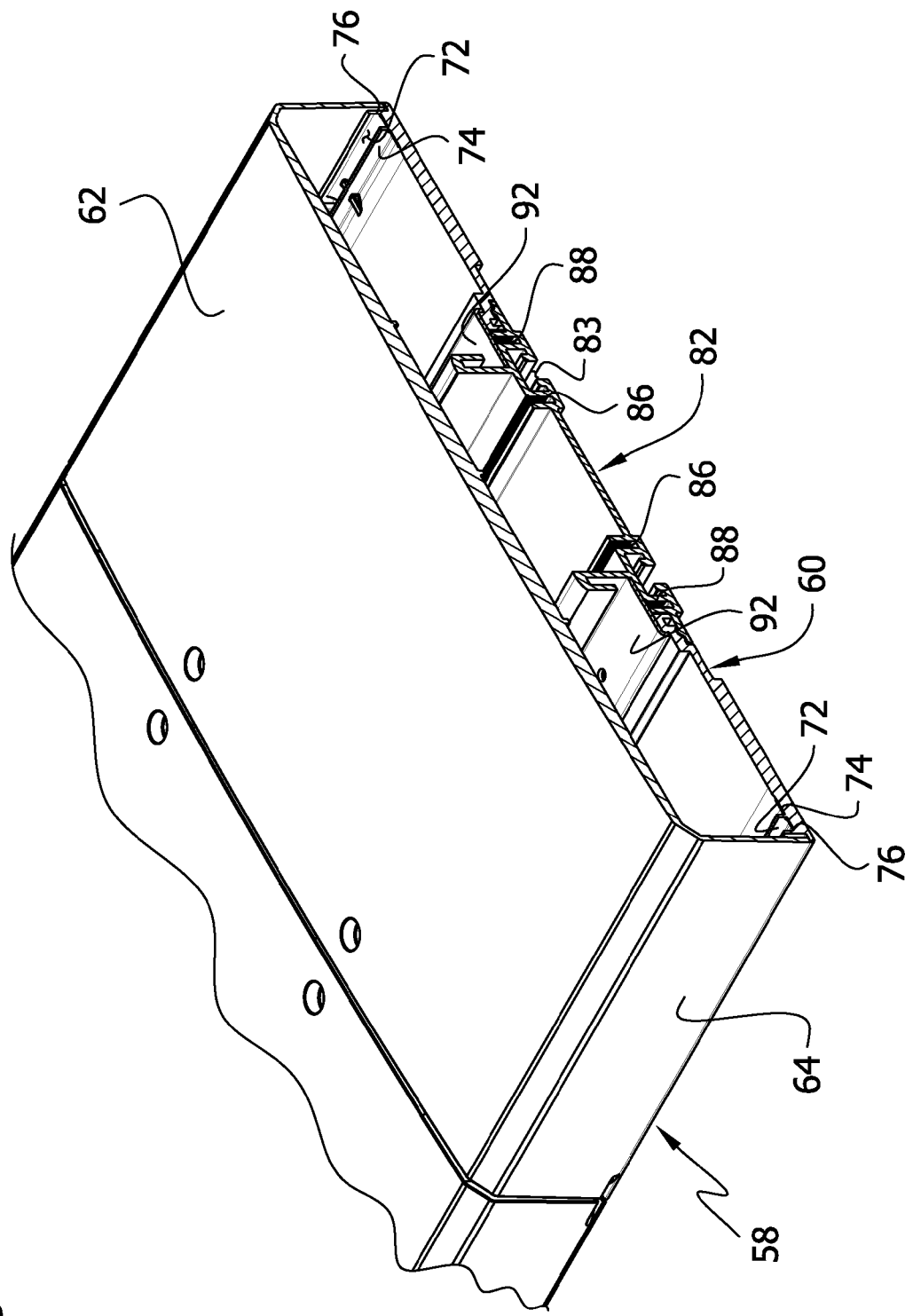
FIG. 9 is a cross-section through a housing module mounted on a base, the light heads being removed for ease of illustration.
Figure 10:
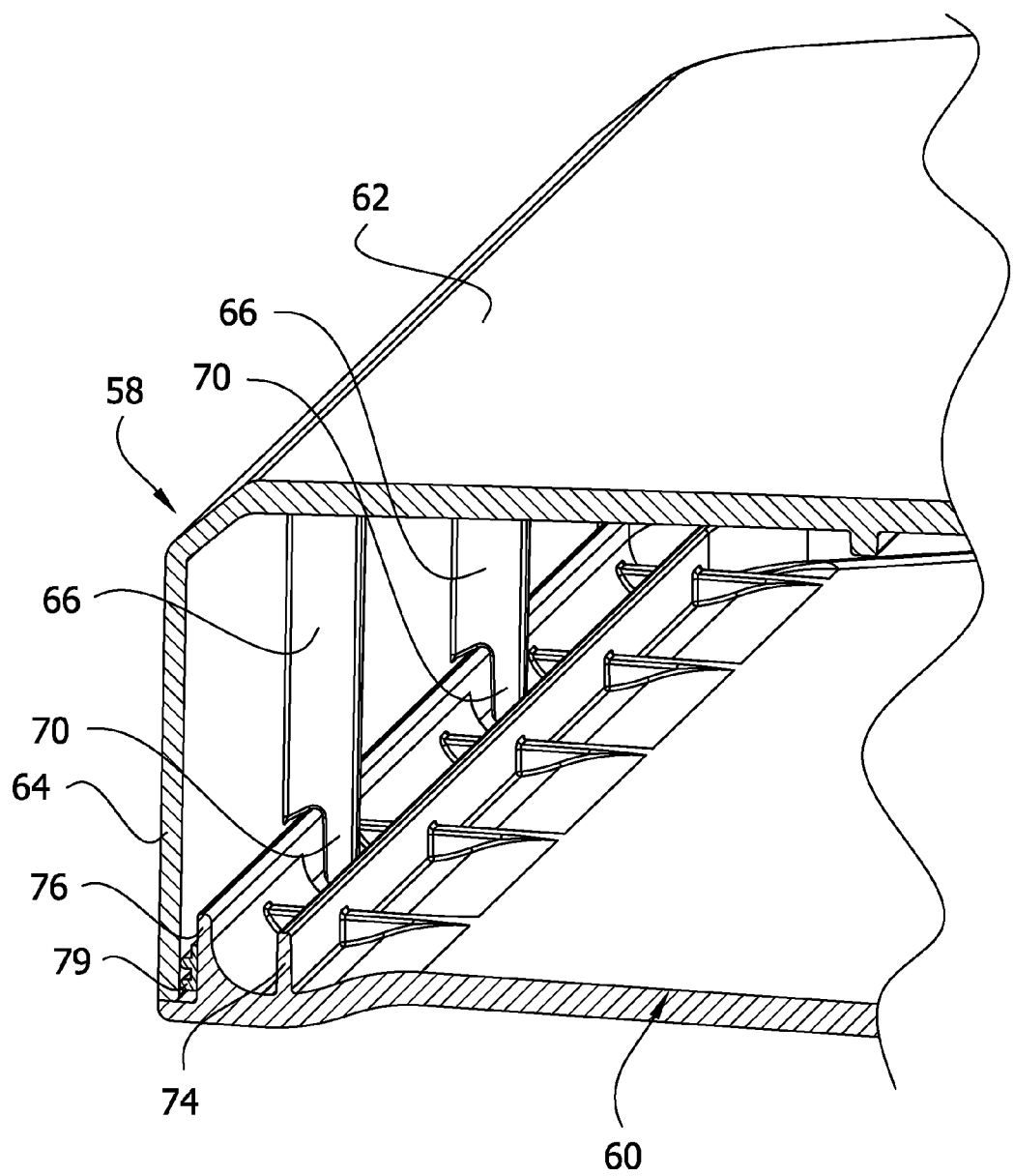
FIG. 10 is an enlarged view of FIG. 9.

Referring to FIGS. 9 and 10, the lens cover 58 includes a plurality of rib members 66 extending downward on the inner side of the lens portion 64. Each rib member 66 includes a finger 70 that is receivable in a channel 72 extending adjacent to the perimeter of the platform 60. The channel 72 is defined by inner and outer upstanding projections 74, 76, respectively, extending upward from the platform 60. The inner upstanding projections 74 of the short and long center housing modules 56b, 56c do not extend along the opposite longitudinal ends of the platforms 60, and the inner upstanding projections of the outboard housing modules 56a do not extend along the inner ends of the platforms. Instead, the outer upstanding projections 76 of the short and long center housing modules 56b, 56c extend as bridge members along the opposite longitudinal ends of the platforms, and the outer upstanding projections of the outboard housing modules extend as bridge members 78 on the inner longitudinal ends of the platforms. A gasket 79 (FIG. 10) is secured to an outside of the outer projection 76, including the respective bridge members 78. The gasket may be a ribbed (e.g., double ribbed) gasket made from rubber or other compressible material and may be attached to the outer projection 76 by pressure sensitive adhesive or in other ways without departing from the scope of the present invention. When the lens cover 58 is secured to the platform 60, the gasket forms a seal between the lens portion 64 of the lens cover and the outer upstanding projection 76 on the platform to prevent moisture and debris from entering the housing module 56a, 56b, 56c. Moreover, because the fingers 70 of the rib members 66 are received in the channel 72 on the platform 60, the rib members prevent bowing or bending of the lens portion 64 so that the lens portion compresses the gasket and a tight seal is formed and maintained between the lens cover and the platform. The lens cover 58 is secured to the platform 60 by fasteners (e.g., screws) extending through openings in the opaque top portion 62 and into threaded openings in four securement posts 80 (FIGS. 8, 13 and 14) extending upward from the platform.

Figure 11:
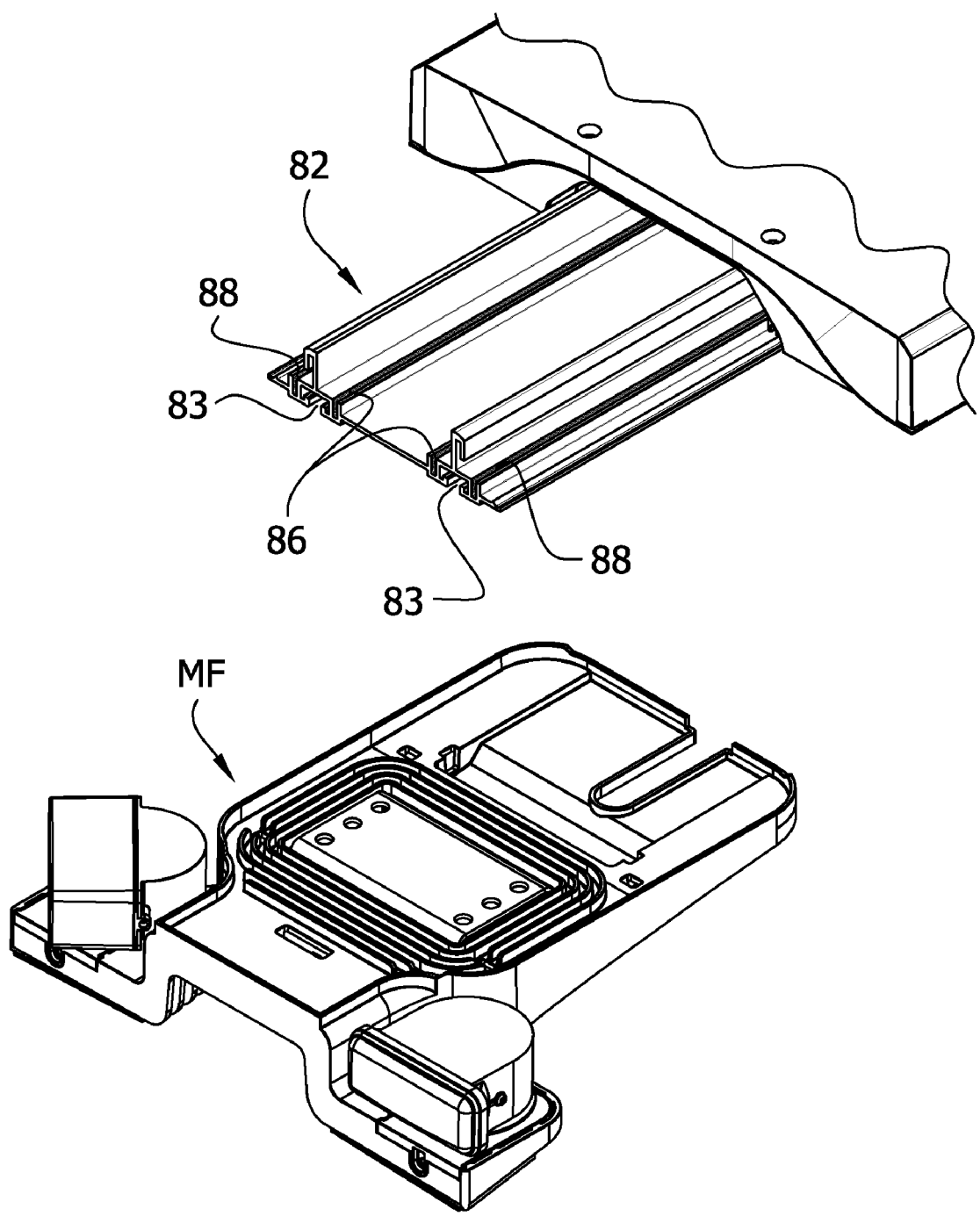
FIG. 11 is a perspective showing the base exploded from a mounting foot.
Figure 12:
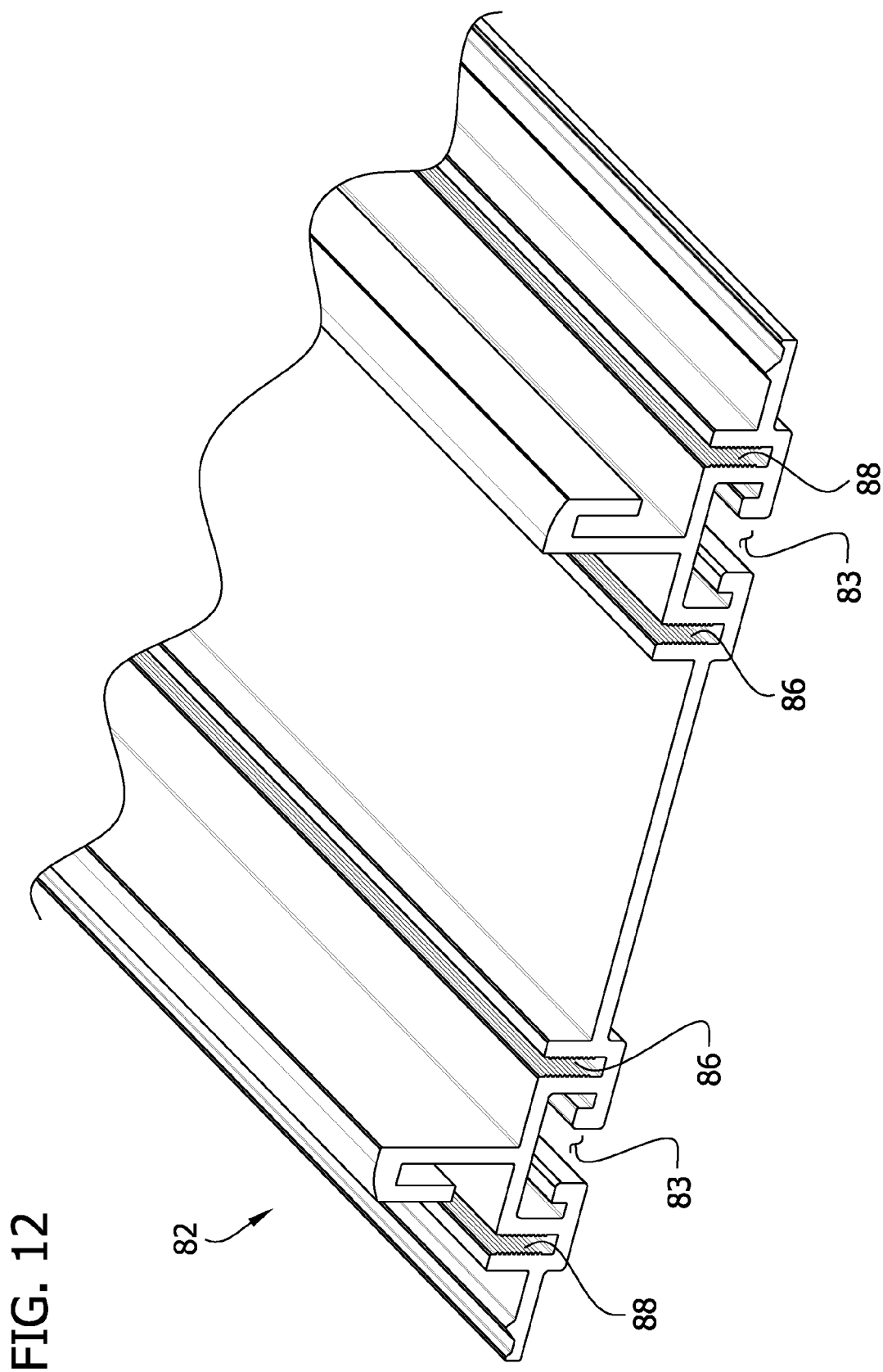
FIG. 12 is an enlarged perspective of an end portion of the base.

As shown best in FIG. 8, each of the housing modules 56a, 56b, 56c is mounted along the length of the elongate base, generally indicated at 82, and the base 82 is in turn secured to spaced apart mounting feet, which secure the light bar 10 to the vehicle. As shown best in FIGS. 10-12, channels 83 on the underside of the base 82 receive a head of a fastener (e.g., bolt or nut) that secures a mounting foot MF to the base. The platform 60 defines a large opening 84 (FIG. 8) for receiving the base 82 when the platform is positioned on top of the base. Referring to FIGS. 9, 11 and 12, the base 82 includes a pair of spaced apart, threaded inner channels 86 and a pair of spaced apart, threaded outer channels 88. The inner and outer channels 86, 88 extend along the length of the base 82. The base 82 may be extruded aluminum, or may be other materials and may be formed in other ways without departing from the scope of the present invention.

Figure 13:
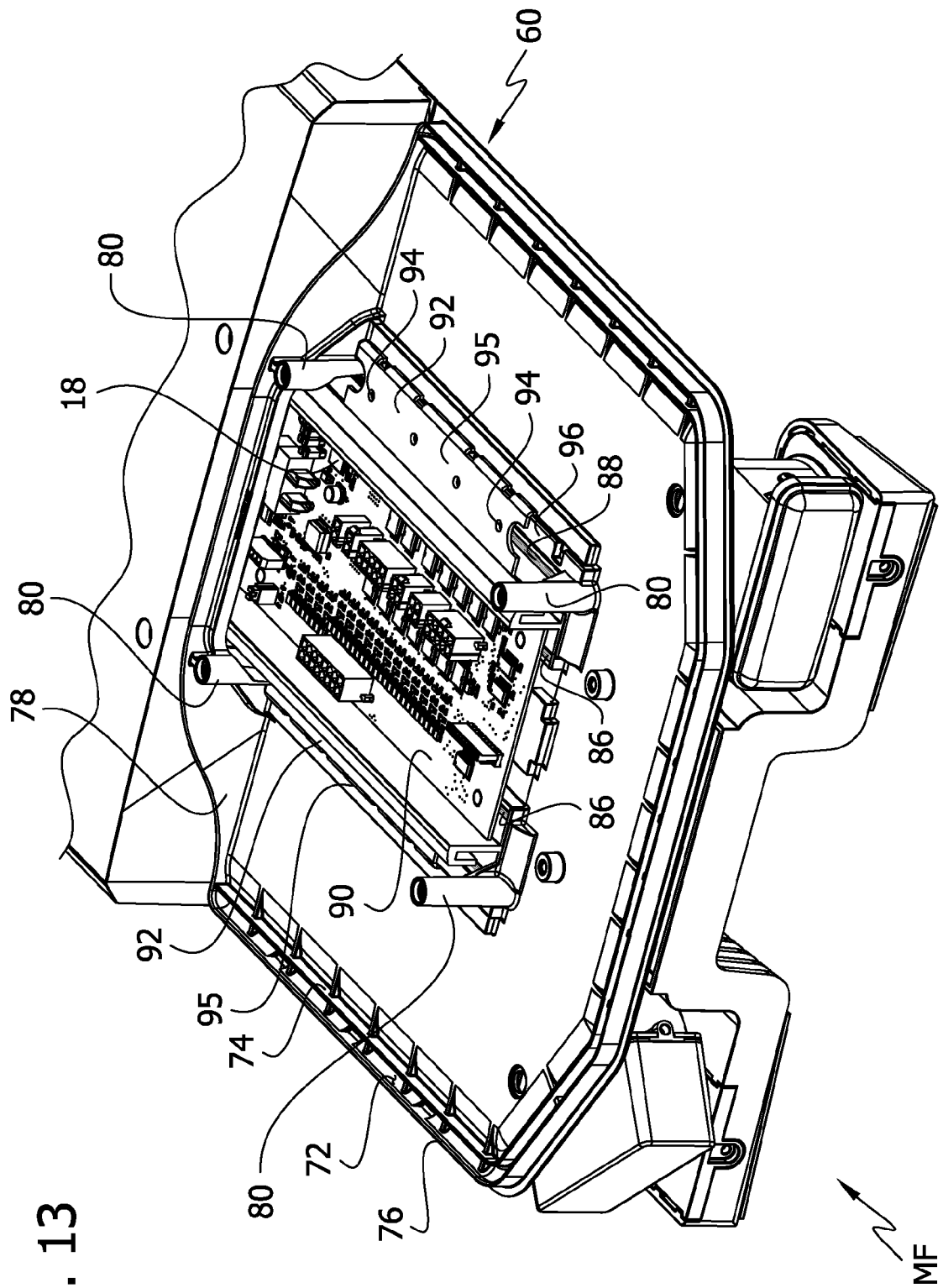
FIG. 13 is an enlarged perspective of the left outboard housing module with the lens cover and the light heads removed.
Figure 14:
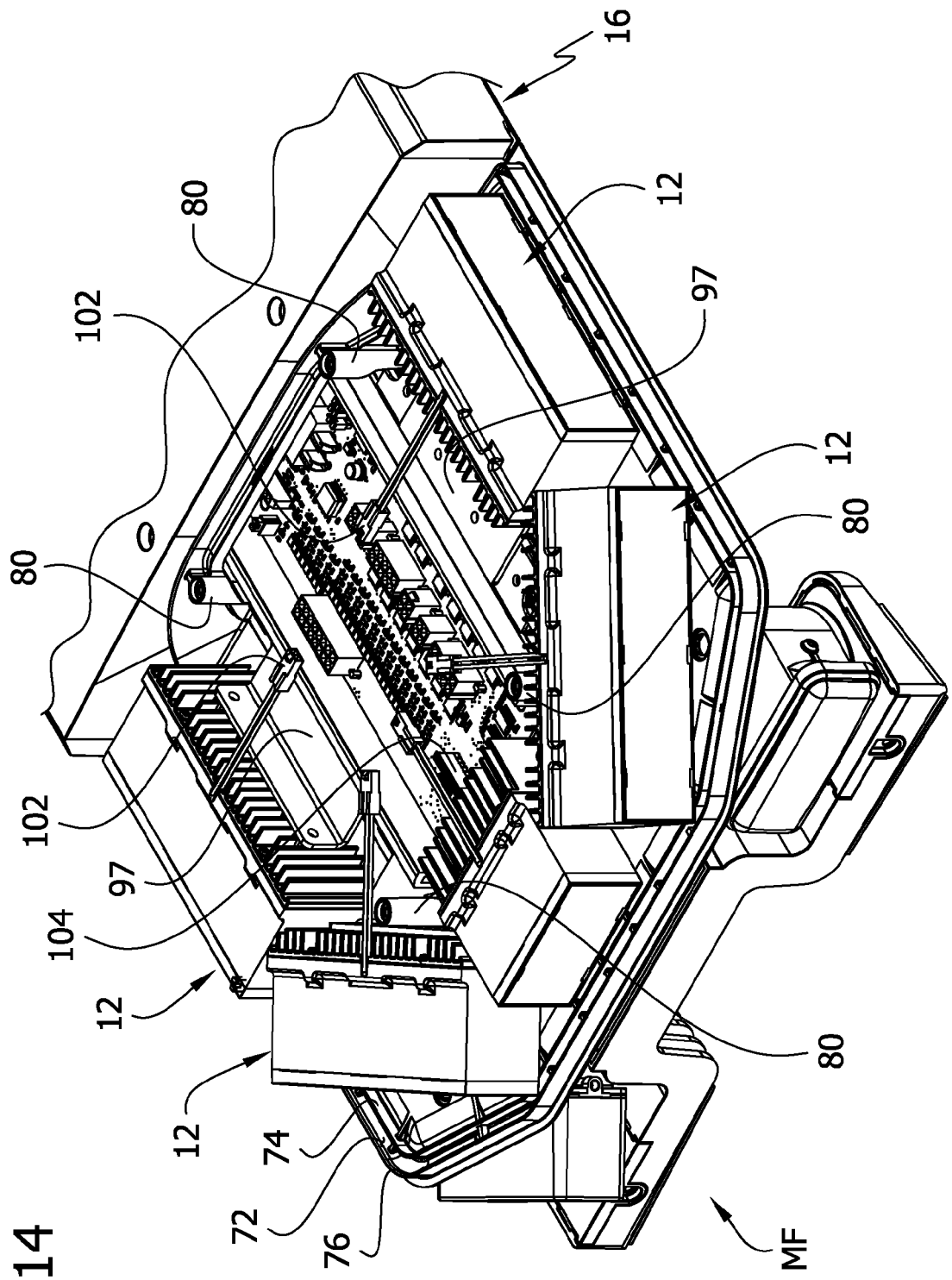
FIG. 14 is an enlarged perspective of the left outboard housing module with the lens cover removed.

Referring to FIG. 13, the inner channels 86 threadably receive fasteners (e.g., screws, not shown) to secure a control board 90 to the base 82. The control board 90 is described in more detail below. The outer channels 88 threadably receive fasteners (e.g., screws, not shown), and each channel is used to secure a brace 92 and/or the light heads 12 to the base 82. The brace 92 includes openings 94 spaced apart along the length of the brace and a flange 95 that engages an edge 96 formed on the platform 60. A bracket 97 extending rearward from each of the front and rear light heads 12 has openings that align with the openings in the brace 92. One or more fasteners received through the aligned openings are threaded into the respective outer channel 88 to secure the front and rear light heads 12 to the brace 92, and to secure the platform 60 to the base 82. The corner light heads 12 and alley light head 12 also include brackets 98 (FIG. 8) for securing the respective light heads to either the base 82 or to the platform 60. Other ways of securing the light heads 12 to the light bar 10 do not depart from the scope of the present invention.

As shown in FIG. 13, the microcontroller 18 is mounted on the control board 90. Other electrical components are also mounted on the control board, including: computer chips acting electrical switches, over-current protection devices, and connectors to provide control and output wire attachment. The control board 90 may also be referred to as a "central controller" or "lightbar controller" in the art. Each light head 12 is electrically connected to the control board 90, and thus the microcontroller 18, by a wire-to-board connection. More specifically, each light head 12 includes an electrical wire-to-board connector 102 for electrically connecting the light head to a mateable wire-to-board connector 104 (FIG. 14) on the control board 90. The wire-to-board connectors 102, 104 allow for quick and easy electrical connection of the light heads 12 to the control board 90, and thus to the microcontroller 18. Accordingly, each of the light heads 12 is easily replaceable by removing the fasteners that secure the light head to the respective housing module 56a, 56b, 56c and disconnecting the wire-to-board connectors 102, 104. A new one of the light heads 12 is then easily mounted on the light bar 10 and the wire-to-board connectors 102, 104 are connected to connect the new light head to the control board 90 and to the microcontroller 18.

Having described embodiments of the invention in detail, it will be apparent that modifications and variations are possible without departing from the scope of the invention defined in the appended claims.

When introducing elements of the present invention or the illustrated embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A light bar comprising:
    a plurality of light heads, each light head comprising:
        a heat sink,
        a circuit board in heat transfer communication with the heat sink, said circuit board having an electrically conductive pathway,
        a chip-on-board (COB) light emitting diode (LED) mounted directly in contact with the circuit board such that heat generated by the COB LED when energized is transferred to the circuit board, said COB LED having an LED chip electrically connected to the electrically conductive pathway of the circuit board,
        an optical concentrator mounted adjacent to the COB LED to capture light emitted by the COB LED when energized and to transmit the captured light, wherein the optical concentrator is a compound parabolic concentrator (CPC),
        an optical collector adjacent the optical concentrator to receive and transmit light from the optical concentrator, and
        an optical collimator adjacent to and spaced apart from the optical collector to receive and transmit light from the optical collector, such that light transmitted out of the optical collimator is a spatially uniform beam, and
        an optical diffuser adjacent to the optical collimator to receive the spatially uniform beam of light transmitted out of the optical collimator and produce an output light pattern that is substantially rectangular and horizontally diverging at a horizontal angle which is greater than a horizontal divergence angle of the spatially uniform beam;
    a transparent housing enclosing the plurality of light heads; and
    a microcontroller electrically connected to each of the COB LEDs to energize each of the LED chips of the plurality of light heads so that the combined output light patterns of transmitted light from the plurality of light heads creates warning light signals that are substantially rectangular and horizontally diverging at a horizontal angle which is greater than a horizontal divergence angle of the spatially uniform beam when viewed by an observer remote from the light bar.

2. The light bar of claim 1 further comprising a bond wire electrically connecting the LED chip to the electrically conductive pathway of the circuit board, wherein bond wire is wedge-bonded to the LED chip.

3. The light bar of claim 1 wherein the COB LED includes a plurality of COB LEDs arranged in a plurality of light emitting areas on the circuit board.

4. The light bar of claim 3 wherein a first of the light emitting areas includes at least one first COB LED configured to emit light having a first color in a first wavelength range, and wherein a second of the light emitting areas includes at least one second COB LED configured to emit light having a second color different than the first color in a second wavelength range different than the first wavelength range.

5. The light bar of claim 4 wherein a third of the light emitting areas includes at least one third COB LED configured to emit light having a third color different than the first and second colors in a third wavelength range different than the first and second wavelength ranges.

6. The light bar of claim 4 wherein at least one of the following: (1) the microcontroller selectively energizes the first COB LED to create warning light signals including light having the first color, (2) the microcontroller selectively energizes second COB LED to create warning light signals including light having the second color, and (3) the microcontroller selectively energizes both the first COB LED and the second COB LED simultaneously to create warning light signals including light having the first color and the second color.

7. The light bar of claim 4 wherein the microcontroller energizes only one of the first COB LED and the second COB LED and does not simultaneously energize both the first COB LED and the second COB LED.

8. The light bar of claim 4 wherein the microcontroller energizes the first COB LED and the second COB LED in a first pattern to provide a traffic directing signal, and wherein the microcontroller energizes the first COB LED and the second COB LED in a second pattern to provide a warning signal.

9. The light bar of claim 4 wherein the microcontroller is configured to energize the light heads in a first pattern and a different second pattern,
    wherein in the first pattern, the microcontroller energizes the first COB LEDs of a first selected set of the light heads and the second COB LEDs of the first selected set of light heads is not energized,
    and wherein during the second pattern, the microcontroller energizes the second COB LEDs of a second selected set of the light heads and the first COB LEDs of the second set of light heads is not energized.

10. The light bar of claim 3 wherein the microcontroller modulates energization of the first COB LED and the second COB LED to create at least two different warning light signals sequentially presented over a predetermined period of time.

11. The light bar of claim 1 wherein the COB LED includes a plurality of COB LEDs arranged in a single light emitting area on the circuit board,
    wherein the optical concentrator is a single optical concentrator associated with the single light emitting area and comprises a single optical path for combining the light from the plurality of COB LEDs to create the warning light signal.

12. The light bar of claim 1 wherein the COB LED comprises a plurality of COB LEDs arranged in a plurality of individual light emitting areas on the circuit board, said light emitting areas being arranged as a linear array on the circuit board,
    wherein the optical concentrator comprises a plurality of optical concentrators, each optical concentrator being associated with one, and only one, of said light emitting areas,
    wherein the optical collector comprises a plurality of optical collectors, each optical collector configured to receive light from one and only one of said optical concentrators,
    wherein the optical collimator is configured to receive and transmit light from the plurality of optical collectors.

13. The light bar of claim 11 wherein each of the COB LEDs is configured to emit light having a different color within a different wavelength than the other COB LEDs.

14. The light bar of claim 12 wherein the circuit board is mounted in a vertical plane in the light bar and the linear array comprises a horizontal linear array comprising a horizontal row of the COB LEDs.

15. The light bar of claim 1 wherein the COB LED emits a white light when energized and wherein an air gap is located between the COB LED and the optic component.

16. The light bar of claim 1 wherein the microcontroller is adapted to selectively energize the COB LED with a pulse width modulated signal having a reduced duty cycle of less than 100%, and wherein the reduced duty cycle provides transmitted light of reduced lumens compared to the lumens provided at a 100% duty cycle whereby night blindness is minimized when the COB LED is energized with the reduced duty cycle and the transmitted light at the reduced duty cycle meets or exceeds minimum requirements for a warning light signal.

17. The light bar of claim 1 wherein the cross sectional area of an output surface of the collector is less than the cross-sectional area of an input surface of the collimator.

18. The light bar of claim 1 wherein the diffuser is configured to partially receive the spatially uniform light beam so that some of the spatially uniform light beam is transmitted by the diffuser and some of the spatially uniform light beam is not transmitted by the diffuser.

19. The light bar of claim 18 wherein the diffuser has an opening positioned over the collimator so that some of the spatially uniform light beam is transmitted by the diffuser and some of the spatially uniform light beam is not transmitted by the diffuser and passes through the opening.

20. The light bar of claim 1 wherein the diffuser is a holographic diffuser having a diffusing angle of greater than 45 degrees.

21. The light bar of claim 1 wherein the compound parabolic concentrator is made from a polycarbonate resin material.

22. The light bar of claim 21 further comprising a transparent material disposed between the compound parabolic concentrator and the LED chip, wherein the transparent material has an index of refraction substantially matching the index of refraction of the compound parabolic concentrator.

23. The light bar of claim 1 wherein a portion of the optical concentrator spaced from the LED chip comprises an input of the optical concentrator, the light bar further comprising a transparent material disposed in a gap between the input of the optical concentrator and the LED chip, wherein the transparent material has an index of refraction substantially matching the index of refraction of the input.

24. A light bar as set forth in claim 12 wherein each optical concentrator is associated with one and only one optical collector to form a plurality of individual optic component including one and only one optical concentrator and one and only one optical collector, wherein each optic component further comprises legs extending from adjacent the optical collector toward the circuit board and secured to the circuit board by fasteners, wherein the optical concentrator, the optical collector, and the legs of each optic component are formed as an integral construction.

* * * * *